US010893262B2

(12) United States Patent
Vetter et al.

(10) Patent No.: US 10,893,262 B2
(45) Date of Patent: Jan. 12, 2021

(54) LIGHTFIELD RENDERING BASED ON DEPTHS FROM PHYSICALLY-BASED VOLUME RENDERING

(71) Applicant: Siemens Healthcare GmbH, Erlangen (DE)

(72) Inventors: Christoph Vetter, Hopewell, NJ (US); Kaloian Petkov, Lawrenceville, NJ (US); Daphne Yu, Yardley, PA (US)

(73) Assignee: Siemens Healthcare GmbH, Erlangen (DE)

( * ) Notice: Subject to any disclaimer, the term of this patent is extended or adjusted under 35 U.S.C. 154(b) by 143 days.

(21) Appl. No.: 15/426,616

(22) Filed: Feb. 7, 2017

(65) Prior Publication Data

US 2018/0227568 A1 Aug. 9, 2018

(51) Int. Cl.
| | |
|---|---|
| H04N 13/00 | (2018.01) |
| H04N 13/395 | (2018.01) |
| G06T 15/08 | (2011.01) |
| G06T 15/20 | (2011.01) |
| H04N 13/232 | (2018.01) |
| G06T 7/557 | (2017.01) |
| H04N 13/128 | (2018.01) |
| H04N 13/324 | (2018.01) |

(52) U.S. Cl.
CPC ........... *H04N 13/395* (2018.05); *G06T 7/557* (2017.01); *G06T 15/08* (2013.01); *G06T 15/205* (2013.01); *H04N 13/128* (2018.05); *H04N 13/232* (2018.05); *H04N 13/324* (2018.05); *G06T 2200/21* (2013.01); *G06T 2207/10052* (2013.01); *G06T 2207/20092* (2013.01); *G06T 2210/08* (2013.01); *G06T 2210/41* (2013.01); *H04N 2013/0081* (2013.01)

(58) Field of Classification Search
CPC ......... G06T 15/08; G06T 15/06; G06T 15/50; G06T 15/80; G06T 17/20; G06T 15/506; G06T 1/60; G06T 2210/52
See application file for complete search history.

(56) References Cited

U.S. PATENT DOCUMENTS

| | | | | |
|---|---|---|---|---|
| 9,147,334 | B2* | 9/2015 | Long | H04Q 9/00 |
| 9,305,191 | B2* | 4/2016 | Long | G06K 7/01 |
| 2004/0125103 | A1* | 7/2004 | Kaufman | G06T 15/06 345/419 |
| 2005/0231341 | A1* | 10/2005 | Shimizu | B60Q 9/005 340/436 |
| 2007/0013696 | A1* | 1/2007 | Desgranges | G06T 15/506 345/426 |
| 2009/0295800 | A1 | 12/2009 | Vetter et al. | |

(Continued)

OTHER PUBLICATIONS

M. Sainz, "MTMesh:image Based Mesh Reconstruction and Rendering" Transactions on Systems, Man and Cybernetics, Part A: Systems and Humans: 767-778(2010).*

(Continued)

*Primary Examiner* — Frank F Huang

(57) ABSTRACT

Physically-based volume rendering generates a lightfield. The locations of scattering modeled in physically-based rendering are used to assign depths for the lightfield. The previously assigned depths and previously rendered lightfield are used for lightfield rendering, which may be performed more rapidly than the physically-based volume rendering.

14 Claims, 2 Drawing Sheets

(56) References Cited

U.S. PATENT DOCUMENTS

| | | | |
|---|---|---|---|
| 2010/0245577 A1* | 9/2010 | Yamamoto | B60R 1/00 348/148 |
| 2011/0058021 A1 | 3/2011 | Chen et al. | |
| 2012/0154582 A1* | 6/2012 | Johnson | G06F 19/321 348/143 |
| 2014/0029849 A1* | 1/2014 | Sen | G06T 15/503 382/167 |
| 2016/0343161 A1* | 11/2016 | Paladini | G06T 15/08 |
| 2017/0236324 A1* | 8/2017 | Yu | G06T 15/06 382/131 |

OTHER PUBLICATIONS

Gortler, Steven J., et al. "The lumigraph." Proceedings of the 23rd annual conference on Computer graphics and interactive techniques. ACM, 1996.

Jensen, Henrik Wann, and Niels Jørgen Christensen. "Photon maps in bidirectional Monte Carlo ray tracing of complex, objects." Computers & Graphics 19.2 (1995): 215-224.

Krivánek, Jaroslav, et al. "Making Radiance and Irradiance Caching Practical: Adaptive Caching and Neighbor Clamping." Rendering Techniques 2006 (2006): 127-138.

Levoy, Marc, and Pat Hanrahan. "Light field rendering." Proceedings of the 23rd annual conference on Computer graphics and interactive techniques. ACM, 1996.

Veach, Eric, and Leonidas J. Guibas. "Metropolis light transport." Proceedings of the 24th annual conference on Computer graphics and interactive techniques. ACM Press/Addison-Wesley Publishing Co., 1997.

Extended European Search Report (EESR) dated Jun. 28, 2019 in corresponding European Patent Application No. 18154622.7.

Zellmann S et al: "Image-based remote real-Time volume rendering a Decoupling rendering from view point updates", Proceedings of the ASME Design Engineering Technical Conference—ASME 2012 International Design Engineering Technical Conferences and Computers Andin Formation in Engineering Conference, IDETC/CIE 2012 2012 American Society of Mechanical Engineers U, vol. 2, No. Parts A and B, 2012, pp. 1385-1394.

Rezk-Salama et al.: "Raycasting of Light Field Galleries from Volumetric Data"; Computer Graphics Forum; 2008; vol. 27; No. 3; pp. 839-846.

Extended European Search Report (EESR) dated Jul. 2, 2018 in corresponding European Application No. 18154622.7.

Rezk-Salama et al.: "Raycasting of Light Field Galleries from Volumetric Data"; Computer Graphics Forum; vol. 27; No. 3; pp. 839-846.

* cited by examiner

LIGHTFIELD RENDERING BASED ON DEPTHS FROM PHYSICALLY-BASED VOLUME RENDERING

BACKGROUND

The present embodiments relate to physically-based volume rendering. In a medical imaging example, an image from a three-dimensional (3D) scan of a patient is rendered for visualization.

Physically-based visualization techniques produce global illumination effects in computer-generated graphics that mimic the real-world interaction of light with various 3D objects or tissues. Monte Carlo path tracing is a useful rendering technique for such light transport computations, where the natural light phenomena are modeled using a stochastic process. The physically-based volume rendering results in physically plausible images that are often easier for the human brain to interpret when compared to the more analytical images from traditional volume rendering, such as ray casting or direct volume rendering. However, evaluation of the rendering integral in physically-based volume rendering may require thousands of stochastic samples per pixel to produce an acceptably noise-free image. Depending on the rendering parameters and implementing processor, producing one photorealistic image with physically-based volume rendering may be on the order of seconds for interactive workflows and multiple hours for production-quality images.

Light field rendering allows much faster generation of photorealistic images, but depends on a large amount of input data that has to be produced in an expensive preprocessing step. This preprocessing step shifts the time demand form the phase of the user interaction to the preprocessing step. This also allows fast rendering on low-powered devices, like tablets or cell phones, while shifting the computationally expensive task of preprocessing to dedicated computer servers.

SUMMARY

By way of introduction, the preferred embodiments described below include methods, systems, instructions, and computer readable media for lightfield volume rendering. Physically-based volume rendering generates a lightfield. The locations of scattering modeled in physically-based rendering are used to assign depths for the lightfield. The previously assigned depths and previously rendered lightfield are used for lightfield rendering, which may be performed more rapidly than the physically-based volume rendering.

In a first aspect, a method is provided for lightfield volume rendering. A physically-based renderer, using a medical dataset representing a three-dimensional region of a patient, renders a lightfield representing the three-dimensional region of the patient in two dimensions. Depths are assigned to locations in the lightfield. A lightfield renderer renders another image representing the three-dimensional region of the patient from the lightfield and depths. The other image is transmitted.

In a second aspect, a system is provided for lightfield volume rendering. A memory stores data representing a lightfield of an object in three dimensions and depths for the lightfield. The lightfield and depths were generated from path tracing from different perspectives of the object. A graphics processing unit is configured to lightfield render an image from a sub-set of the lightfield and depths for the lightfield of the sub-set.

In a third aspect, a method is provided for lightfield volume rendering. A lightfield representing a three-dimensional object from different perspectives are Monte Carlo-based volume rendered. Depths are assigned to the lightfield based on scatter points modeled in the Monte Carlo-based volume rendering. An image is rendered from the lightfield and depths.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

Interactive photorealistic visualization of volumetric data where the renderer uses computationally expensive techniques for the light transport simulation is challenging. Volume rendering for highly realistic or 'cinematic' quality based on stochastic Monte Carlo sampling of the volume requires a huge computational load and is therefore slow.

Using a lightfield for the final color produced by the volume renderer allows more rapid rendering. The more rapid rendering may allow use with remote clients, low-power thin clients, and/or augmented reality (AR) or virtual reality (VR) devices. In this approach, the high-quality Monte-Carlo raytracing is used to pre-render images.

Lightfield rendering allows high-quality rendering of scenes, but relies on a large amount of pre-rendered or prerecorded data. With better filtering, the amount of data to be prerendered and therefore also the amount of data to be stored and accessed for the interactive rendering of the lightfield may be reduced. The filtering uses interpolation or other selection to determine color for views not included in the stored lightfield. Depth information may be used to improve the filtering and the fidelity of the lightfield rendering. The pre-rendered images, including depth images, are used to interpolate a more realistic view.

Path-tracing, such as Monte-Carlo-based path tracing, does not provide a good definition of depth, possibly resulting in image artifacts in the lightfield rendering. By using a combination of depths of various scattering points used in the physically-based rendering, depths may be assigned for the different rays or positions in the lightfield.

Figure 1:
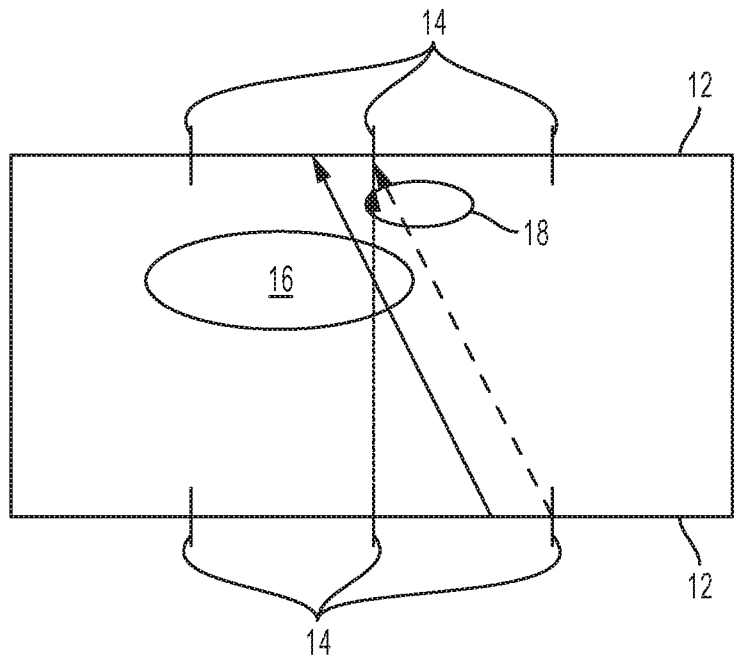
FIG. 1 shows an example use of depth for lightfield rendering.

FIG. 1 shows how depth provides important information for the filtering. The top and bottom lines indicate two planes 12 defining a light slab. Each of the two planes 12 has three positions 14 after discretization. Each position 14 provides for radiance at that position 14 for each orientation of rays from the position 14 on one plane 12 to the positions 14 on the other plane. The dashed ray shows one example. The dotted ray shows another example. The solid ray represents a ray to be created by filtering and connects two points different than the lightfield positions on the two planes 12. The dashed ray is the closest ray in origin, but the dotted ray intersects the displayed object 16 at a closer point than the dashed ray. Using depth information of the first hits along the rays, the ray providing the most accurate position can be selected. In this example, the dotted array is closer to the solid ray at the scattering depth, so is used for filtering. This selection avoids using the color for the object 18 for the solid ray, but instead using the color for the object 16 from the dotted ray, increasing fidelity or avoiding artifacts.

To filter, the depths of the objects in the lightfield are determined. For each lightfield pixel (e.g., ray from one sample point 14 to another sample point 14), a depth is determined in the path tracing. For example, Monte-Carlo sampling is used to improve the accuracy and consistency of depth information for Monte-Carlo rendered images. The lightfield and depths generated from the path tracing are used for interactive lightfield rendering.

Figure 2:
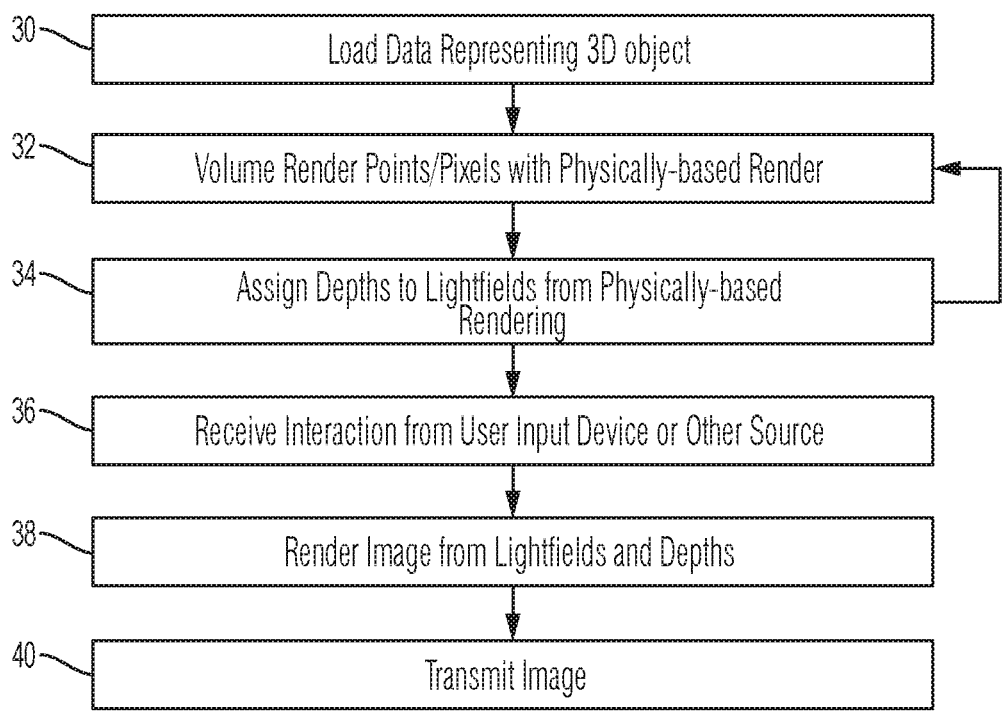
FIG. 2 is a flow chart diagram of one embodiment of a method for lightfield volume rendering.

FIG. 2 shows one embodiment of a method for lightfield volume rendering. Physically-based volume rendering is used to generate the lightfield. Depths are heuristically assigned to pixels (e.g., rays) rendered with path tracing, such as Monte Carlo path tracing, at different camera positions. The color or intensity is a radiance for each position and orientation. The depth for each pixel or ray defines the depth along the ray of the lightfield of intersection with an object. For rapid rendering and/or in response to user interaction, images may be rendered from the lightfield instead of the more time consuming physically-based volume rendering.

The method of FIG. 2 is implemented by a processor and/or a graphics processing unit (GPU) in a server, computer, mobile device, or other machine. In one embodiment, the system of FIG. 4 implements the method of FIG. 1, with or without the medical imager 56, user input 54, and/or display 60. For example, data is input by loading from a memory in act 30, and a processor and/or GPU performs acts 32-40.

The acts are performed in the order shown (top to bottom) or another order. The loop-back from act 34 to act 32 represents a repetition to generate the lightfield from different camera positions. Act 36 may occur prior to acts 32 and/or 34.

Additional, different, or fewer acts may be provided. For example, act 30 is not provided, such as where the data is streamed or provided from a scanner. In another example, act 36 is not provided, such as where default or processor-determined viewpoints are used. In yet another example, act 40 is not provided. Example additional acts include receiving rendering parameters and physically-based volume rendering a photorealistic image after obtaining a desired image using the lightfield.

In one embodiment, acts 30-34 are performed for creating the lightfield and depths without lightfield rendering. In another embodiment, acts 36-40 are provided for lightfield rendering based on the stored lightfield and depths without performing acts 30-34. In yet another embodiment, all or any sub-set of the acts are performed.

In act 30, data is loaded from a memory, sensors, and/or another source. The data represents a 3D object, such as a machine or part. In one embodiment, the data represents a patient. In the examples below, medical imaging or scanner data is used. A medical scanner may provide the data, such as a medical dataset representing a 3D region of the patient. Any type of medical data is obtained, such as computed tomography, magnetic resonance, positron emission tomography, single photon emission computed tomography, ultrasound, or another scan modality. Scan data representing a 3D volume is loaded as a medical dataset. The scan data may be from multiple two-dimensional scans or may be formatted from a 3D scan. In other embodiments, other types of data are used.

The data is formatted as voxels in a uniform or non-uniform 3D grid, but a scan format (e.g., polar coordinate format) may be used. Each voxel or grid point is represented by 3D location (e.g., x, y, z) and an intensity, scalar, or other information.

In act 32, a physically-based renderer renders pixels representing the 3D region of the patient. The physically-based renderer is a graphics processing unit, array of graphics processing units, workstation, server, computer, processor, or other machine capable of the computations. Parallel processing capability is preferred given the repetitive nature of the rendering.

The renderer collapses or projects the 3D representation (i.e., data) of the object into two dimensions. The voxels are converted into pixels. Each pixel represents a point in a display or frame of data as if viewed by a person from a given camera position.

In one embodiment, the physically-based renderer renders a photorealistic image of the 3D region of the patient. Any physically-based rendering algorithm capable of computing light transport may be used, such as path tracing, unbiased path tracing, Monte-Carlo path tracing, or Metropolis light transport. The physically-based rendering simulates the physics of light propagation to create an image instead of accumulating volume samples with local illumination along viewing rays from the camera, as is done for traditional direct volume rendering. In path tracing implemented for physically-based rendering, the paths of light or photons, including due to scattering and absorption, are modeled and used for rendering. Photons are repetitively modeled for each path using stochastic scattering and absorption. The physically-based rendering result may be built up over time as the rendering may rely on probabilistic scattering and tracing millions of light paths.

The rendering results in a photorealistic image. For a given set of values of rendering parameters, a single image is output. The rendering parameters are a default set, set by the user, determined by a processor, or combinations thereof. The rendering parameters may include data consistency parameters. Data consistency parameters include windowing, scaling, level compression, data normalization, or others. The rendering parameters may include transfer function design parameters. Transfer function design parameters include classification look-up tables, multi-dimensional transfer functions, tissue-specific transfer functions, or other transfer functions. The rendering parameters may include lighting design parameters. Lighting design parameters include type of virtual lights, position of the virtual light sources, orientation of the virtual light sources, image-based lighting sources, ambient lighting, or others. The rendering parameters may include viewing design parameters. Viewing design parameters include type of camera, position of the camera, orientation of the camera, intrinsic parameters for viewing, or others. One or more use-case specific parameters may be provided. Use-case specific parameters are settings specific to a given use, such as a particular camera position for a given type of medical report or use of two cameras for stereoscopic viewing.

The parameters may be specific to physically-based rendering, such as internal render properties. The setting for any parameter for path tracing, unbiased path tracing, Monte Carlo rendering, global (i.e., indirect) illumination, or other simulations of light propagation may be used. For example, a global albedo or surface reflectance coefficient, which describes the relative importance of light scattering versus light absorption, may be used. During path tracing, different levels or amounts of scattering and/or absorption are modeled for different locations based on the data representing the 3D object. The scattering and/or absorption of photons is modeled for each sampling point (e.g., voxel). Transparency, reflectivity, surface roughness, and/or other properties derived from the data may be modeled in the physically-based rendering. Albedo may be a per-material property for the different tissue classes in the volume data.

The output of the renderer in one embodiment is a 2D grid of pixels that matches the resolution of the display output device. In one embodiment, this output is used as-is and without any modification to the rendering algorithm. Each pixel represents a visual characteristic for a different area. For example, each pixel includes a color value (e.g., red, green, blue (RGB) value). A scalar or grey scale value may be used instead of or as the color.

The rendered image is used as part of a lightfield. A multitude of rendered images is used as a lightfield. The camera position determines the ray orientation, the pixel determines the location on the light slab or plane 12, and the rendered color or intensity determines the radiance. The lightfield represents the three-dimensional region of the patient in two dimensions. To provide the radiance for the locations at different orientations (e.g., rays between different discretized points on the planes 12), the physically-based volume rendering is repeated from different perspectives, as represented by the feedback from act 34 to act 32. By rendering at a plurality of different camera positions and angles relative to the medical dataset, a lightfield is generated.

Any generation of the lightfield may be used. Lightfield rendering creates virtual views from previously rendered or photographically captured image data. The previously rendered or captured image data are the lightfield. This approach allows recreating views of real scenes in every detail, including very subtle interactions between light and matter. By pre-generating the views, complex or processing expensive rendering algorithms may be used to produce the lightfield before any interactive rendering. The lightfield is then used for real-time rendering and/or interactive rendering.

The lightfield is a simplified version of the plenoptic function. The plenoptic function captures the radiance for every position and orientation in a region of space. With three dimensions that describe the position and two dimensions that describe the orientation, this results in a five-dimensional function. Given the plenoptic function, every possible view within that scene may be reconstructed as a lightfield prior to interactive rendering. The plenoptic function is sampled for every viewing ray possibly generated by the camera.

The five-dimensional plenoptic function is large in practice. Additionally, sampling of the plenoptic function is not possible within occluded spaces. Therefore, the following simplifying assumptions are made. The plenoptic function is sampled outside the bounding hull of the object rendered, and the empty space (that is air) around the object does not attenuate the light. With these assumptions, the radiance along a ray stays constant, and the dimensions may be reduced by one (i.e., depth), resulting in a more manageable four-dimensional function, the lightfield.

A simple way to parameterize the lightfield is with a light slab as represented in FIG. 1. Two (finite) planes 12 are introduced around the object of interest. With the position on the first plane 12 described by the vector (s,t), and the position on the second plane 12 described by the vector (u,v), images are generated (i.e., rendered) by shooting a ray from every possible (discretized) position (s,t) to every (u,v). As long as the camera frustum does not partially lie outside these planes, every view may be reconstructed from a collection of image of the lightfield. To capture the object from different sides, six of these light slabs are used.

Another approach to the parameterization is to use two enclosing spheres. The camera origin then moves on the outer sphere and captures images of the inner sphere. The inner sphere is still outside or equal to the bounding sphere of the object of interest. A lightfield (e.g., rendered image) is created for each of the camera origins and/or view directions. Spherical parameterization of the lightfield reduces the number of artifacts compared to slabs.

To avoid artifacts due to depth discrepancy in lightfield rendering, depths are assigned to the locations in each of the lightfield in act 34. The processor or graphics processing unit determines a depth for each ray (e.g., orientation at a given position) of each lightfield. The depth dimension is included in the lightfield or treated as a separate vector.

The depth may be determined by segmentation. By processing the medical scan data representing the volume, the surfaces of objects are determined and used to assign depths for any given ray of the lightfield. Projection rendering (e.g., ray casting) may be used, such as assigning depth based on rays projected through the volume. Ray casting usually defines the depth as the point along the ray at which the opacity reaches a pre-determined threshold.

Rather than requiring extra processing associated with traditional volume rendering or segmentation, the depths may be assigned using the path tracing or other physically-based volume rendering. For example, the scatter points modeled in the Monte Carlo-based volume rendering are used to determine the depth. Monte-Carlo sampling provides superior results when rendering data, and using different methods for the rendering and the creation of the depth data may introduce artifacts.

In Monte-Carlo path tracing, a random number generator determines up to what opacity a ray is traced through the volume. Then, depending on the gradient magnitude, the ray might be scattered. Locations of scatter correspond to surfaces. The scatter points indicate where the depth may be sampled. Due to the random sampling in physically-based volume rendering, different potential depths are considered. The scattering occurs at different depths due to the stochastic nature of the rendering. In physically-based volume rendering, a single or given pixel produced from the volume renderer contains the projection of points along a viewing ray through the volume. Therefore, it is not possible to define a single depth value for that pixel in the general case.

To generate depths for the pixels based on path tracing, one or more heuristic algorithms compute representative depths along viewing rays. Viewing rays are simulated through the volume. These primary viewing rays intersect with voxels in path tracing. A depth is located for each pixel with a given camera position, providing a depth for each ray of the lightfield defined by the camera position relative to the pixel locations.

In one example, the depth for a given ray of the lightfield is assigned based on the location of scattering. For voxels with scattering above a threshold, the average depth is calculated. The scattering is used by the physically-based rendering, so is available for depth determination. Any threshold may be used. A running average of the depth as indicated by the Monte-Carlo method at one pixel location is used. The average depth likely converges to a surface, resulting in outliers being filtered out.

A weighted average may be used. The weights applied to the averaging of the depths from scattering are based on the color or intensity for the voxel. The color or intensity at any scatter depth included in the average weights the contribution to the average. The color or intensity is available as part of physically-based rendering (e.g., part of the medical scan dataset as voxel values), so may be easily used to calculate depth in conjunction with physically-based volume rendering. Any mapping of color or intensity to weight may be used, such as mapping higher scalar values or brighter color to greater weight and lower scalar values or less intense color to lesser weight. Likelihood of scattering may be used instead of color or intensity, such as greater likelihood of scattering being weighted more heavily than lesser likelihood of scattering. The likelihood of scattering is based on the intensity or color for the voxel. In other embodiments, other thresholding and/or derived values may be used for weighting and/or averaging.

In yet another example, the depth is located with clustering. Each of the sampling points used by the physically-based renderer in rendering the pixels include an amount of scattering. The sampling points along a ray are based on the optical model used in rendering. By clustering sampling points, a depth or depth range associated with the greatest cluster (e.g., greatest average scattering, greatest total scattering, greatest number of sample points in the cluster, and/or nearest depth with sufficient cluster of scattering) is assigned to the pixel or lightfield ray. For the pixels, depths are assigned to the pixel data based on scatter points modeled in the Monte Carlo-based volume rendering.

Any clustering may be used. For example, k-means clustering of the scatter points along the view rays is performed. Each depth has a probability of scattering. By finding a cluster or grouping of similar probabilities of scattering, a surface is identified. The depth of the surface is used. The depths for clusters of the scatter points are assigned.

In another example, the clustering uses a histogram of depths for the back scatter or sample points with a threshold amount of scatter. The depths are used to populate a histogram. Each bin includes a range of depths. Since the physically-based rendering is stochastic, M passes are made for each ray with the scattering resulting in different or the same depth for each pass. The bin of the histogram with the greatest number of members or hits (i.e., scatter points) is found. The bin provides the depth to be assigned to the ray or pixel. Alternatively, the bin of the histogram with sufficiently high scatter probability and sufficiently high number of members is used.

In another embodiment, multiple depth histograms are used. Once a depth is found in the first histogram, the range of depths for that bin is then redistributed into a separate histogram. The range of depths for the one bin is sub-divided. The bins of the next histogram are each assigned as different sub-ranges of the bin of the first histogram. For example, the depth of the scene (or the object depicted in the scene for medical volume rendering) is binned into N bins (e.g., N=16). After M rendering passes have been performed in physically-based rendering for the ray, the bin with most hits is subdivided into N bins again and the hits in other bins are discarded. This sub-division may proceed until convergence or a given number of iterations. The depths in the bin of the final histogram with the highest number of hits are then averaged to compute the depth at that pixel position.

Other heuristics may be used to determine depth for each ray (i.e., orientation for a given pair of points on the opposing planes 12). Combinations of heuristics may be used.

A depth is computed for each ray (i.e., line between discrete points on the bounding planes or spheres) of the lightfield. Physically-based rendering provides the lightfield and the depths.

In other embodiments, more than one depth may be assigned along a given ray of the lightfield or for a given pixel of a rendering used in the lightfield. For example, clustering may show several surfaces. The color is assigned to each surface. Alternatively, the scattering for each surface is used to assign a surface specific color as part of the rendering. For each view or primary view ray, colors for multiple depths are provided, for at least some pixels or rays. Where a given ray does not pass through a surface, no color and depth is assigned. Where a given ray passes through only one surface, only one depth is assigned. In an alternative, windowing is used. Different objects represented by the 3D data are rendered separately, providing for different depths and different colors depending on the object being rendered. In yet another alternative, rendering and depth assignment are provided in a sequence where outer layers of data are progressively removed.

For rendering an image from the lightfield, a camera location and orientation are received in act 36. The renderer, such as a graphics processing unit, receives the camera view as an interaction on the user interface. The camera view is provided from a user input on a user input device. For example, a touch screen, mouse, keyboard, trackball, or other device receives input from a user. The interaction is transmitted from the user input device to the processor performing act 38 or to a processor that then transmits to the processor performing act 38.

In alternative embodiments, such as fly-through, a processor determines a path relative to the volume, and the camera position and orientation are provided by the processor. The user may alter the camera and/or interact in a way that changes the camera view.

The interaction is relative to an image of the pixels, another image, lightfield image, or a user interface for rendering an image. For example, a photorealistic image generated by physically-based volume rendering or generated by lightfield rendering is displayed. The user inputs an alteration of a value or setting of a rendering parameter (e.g., camera position or orientation) after viewing the image. This interaction provides for a change in the rendering. For generating a physically-based volume rendering, each change may be associated with seconds, minutes or hours of waiting for sufficient rendering.

To avoid this delay, lightfield rendering is used. Depending on the camera location and orientation, one or more images of the lightfield are selected to render the image. If the camera is positioned to view the volume from a same location used to create one of the images in the lightfield, the image from the lightfield is used. Where the camera is positioned differently than any of the images used to create the lightfield, then one or more images of the lightfield are filtered to render a new image. Given the camera orientation or perspective, the different images of the lightfield visible to the camera are selected for rendering in response to the user interaction.

In act 38, an image is rendered from the lightfield and depth. Another image different than any of the physically-based rendered images is generated. This other image represents the 3D region of the patient, but from a different camera position. The images of the lightfield and depth are selected for a given camera position determined from the user interaction. The selected lightfield and depth are used for interpolation of the image from the lightfield (e.g., lightfield rendering by filtering).

For lightfield rendering, the radiances are streamed from the memory to the renderer or graphics processing unit. Based on the received camera location and orientation, the lightfield or images of the lightfield used for lightfield rendering are streamed or transferred for rendering. For example, the radiances for the locations in the field of view of the camera are streamed to a graphics processing unit as virtual textures.

Depending on the exact camera location from which the new view is generated, different regions of the light field are to be available in fast memory (e.g., buffer or cache of a graphics processing unit). The camera locations for the generation of the lightfield are distributed along the outer sphere, all pointing towards the inner sphere, capturing the object of interest. Where the camera field of view intersects the outer sphere, the lightfield regions are available for interpolation. Rays from within the camera view frustum intersect the outer sphere anywhere in the area on the sphere. Views that are generated by camera positions outside the intersection on the sphere may not be necessary for the image generation, so the corresponding lightfield is not streamed. For border cases for interpolation, the next camera position outside the area of intersection on the outer sphere may be streamed as well.

The scanner, computer, graphics processing unit, central processing unit, or other device renders an image from the lightfield. Based on the position of the camera relative to the lightfield, the visible lightfield or lightfield are identified and used to render by filtering the lightfield. Using interpolation or other lightfield rendering as the filtering, an image is generated from the visible lightfield. The renderer performs any now known or later developed generation of an image from the lightfield. The radiances are used to generate the image.

The depths are used in the filtering. The depths are used to determine the closest rays for interpolation. The interpolation selects a closest ray or performs a distance weighted average between any number of closest rays. The colors or intensities for each of the rays are interpolated.

The closest ray at either of the planes 12 may not be the closest ray at the scatter location. The depths are used to find the closest ray to use, such as represented in FIG. 1. The dotted ray is used instead of the dashed ray to interpolate a color for the solid ray. The depths for each of the rays indicated the location in three dimensions for calculating the closeness. The distance (e.g., Euclidean distance) between the rays at the depths for the rays is used to find the closest for interpolation.

Figure 3:
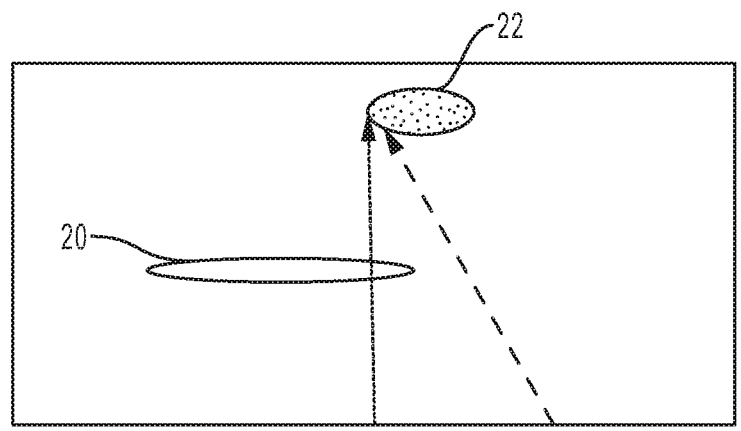
FIG. 3 shows another example use of depth for lightfield rendering.

The depths are used to provide conservative filtering or to filter out rays that include an artifact inducing contribution. For example, FIG. 3 shows a solid arrow representing a ray to be interpolated for the lightfield rendering. The solid ray is defined by the camera position for the desired lightfield rendering. The dotted arrow represents a viewing ray in the lightfield data. For the dotted ray, the depth or the first depth encountered for the ray is at the object 20. The color (e.g., blue) for the dotted ray is based on the object 20. The solid ray being interpolated first intersects with the object 22, so should be a color of the object 22 (e.g., red). The depth assigned to the dotted ray is different than the depth from dashed ray. The correct depth for the solid ray may be found by clustering the depths of all the close rays (not shown in diagram), so that the depth of the dashed ray may be discarded as an outlier. This may possibly also be performed iteratively. If depth indicates that the first hit is with the object 22, but the predominant color results from the intersection with the object 20, then the interpolation results in a blueish color instead of the correct red color.

A color or intensity is interpolated for each pixel of the image being lightfield rendered. Using the depths and the radiance, the color or intensity is determined. The pixels provide the lightfield rendered image of the 3D object without requiring the time consuming physically-based rendering at the time of interaction. The image is rendered from the lightfield based on the interaction from the user, providing more immediate results with similar fidelity, look and feel, or visual quality as if performed using physically-based rendering.

In act 40 of FIG. 2, the image or images rendered from the lightfield are transmitted. The interaction of act 36, lightfield rendering of act 38, and transmittal of act 40 may be repeated, such as where the user continues to interact with the image for further rendering.

The lightfield renderer, host computer of the renderer, or other device transmits the image or images with or without transmission of a photorealistic image. The transmission is over a bus, through a network interface, over a network, to a memory, or to a display. For example, the image is loaded into a buffer and output from the buffer to a display for viewing by a physician to aid diagnosis or pre-operative planning. A computer-generated representation of the medical data suitable for viewing by human users (e.g., 2D images, videos, stereoscopic image pairs, volumes, holograms, or lightfield) is output. Alternatively, the output may be for storage and/or for machine analysis.

The transmission may be for any one or more of various purposes. In one embodiment, the transmission of a final photorealistic image generated with the lightfield is part of a diagnostic report. A given diagnostic report may be specific to context, such as a report for kidney stones. Any kidney stones should be visible in an image. The photorealistic image shows kidney stones based on the values of the rendering parameters determined through interaction. The optimal context-specific images are provided for a diagnostic report in the clinical workflow.

In another embodiment, the transmission is to a display as an image for interactive viewing. The interaction with more rapid lightfield rendering is used to quickly determine the desired camera position and/or orientation. Other uses of images rendered from the lightfield may be provided.

In yet another embodiment, the transmission is to an augmented reality device. For example, a physician may wear augmented reality glasses. The image, with or without added annotations or graphics, from the lightfield rendering is projected onto the glasses as an overlay on the actual view seen by the wearer. In other example, the image is combined with a camera image and/or is used as a replacement for the camera image. In an augmented reality setup, the rendered image may be overlaid onto a live stream of real-time medical images (ultrasound, x-ray, optical laparoscopy, etc.). The transmission may be to other mobile devices, such as smart phones, tablets, glasses, wearable displays, and/or carriable displays.

Figure 4:
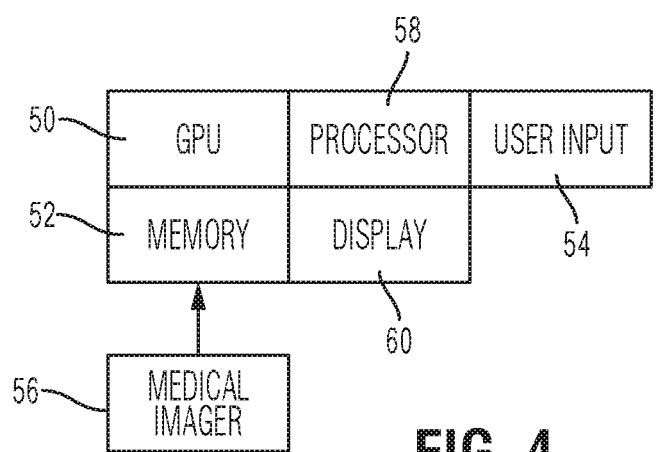
FIG. 4 is a block diagram of one embodiment of a system for lightfield volume rendering.

FIG. 4 shows a block diagram of one embodiment of a system for lightfield volume rendering. The system uses Monte Carlo path tracing or other simulation of photon propagation with scattering and absorption of light to render colors for different locations. The renderings may be used as or converted to the lightfield. Depths are assigned to the locations or rays of the lightfield. The lightfield may then be used rendering images more rapidly than provided by path tracing. This allows interaction or other operations to occur more rapidly.

The system implements the method of FIG. 1. Other methods or acts may be implemented, such as generating the lightfield from Monte Carlo path tracing and/or lightfield rendering an image from the lightfield using depths based on the path tracing.

The system includes a graphics processing unit 50, a memory 52, a user input device 54, a medical imager 56, a display 60, and a processor 58. Additional, different, or fewer components may be provided. For example, the medical imager 56 and/or memory 52 are not provided. In another example, a network or network connection is provided, such as for networking between the processor 58 to a mobile device. A user interface may be provided for interacting with the GPU 50, processor 58, or other components. The GPU 50 may not be used or may be combined with the processor 58.

The GPU 50, memory 52, and/or processor 58 are part of the medical imager 56. Alternatively, the GPU 50, memory 52, and/or processor 58 are part of a server, workstation, or computer separate from the medical imager 56. The GPU 50, memory 52, and/or processor 58 are a personal computer, such as desktop or laptop, a workstation, a server, a network, or combinations thereof. In yet other embodiments, the GPU 50 and memory 52 are part of a separate computer from the processor 58. The processor 58 may be part of the medical imager 56, the GPU 50, a mobile device, or be a separate component.

The medical imager 56 is a medical diagnostic imaging system. Ultrasound, computed tomography, x-ray, fluoroscopy, positron emission tomography (PET), single photon emission computed tomography (SPECT), and/or magnetic resonance systems may be used. The medical imager 56 may include a transmitter and includes a detector for scanning or receiving data representative of the interior of the patient. The medical imager 56 acquires scan data representing the patient. The scan data represents a volume of the patient, such as an N×M×R region where N, M, and R are integers greater than 1 (e.g., 100×100×100).

In alternative embodiments, the medical imager 56 is not provided, but a previously acquired dataset for a patient is stored in the memory 52. In yet other alternatives, data from other scanners for non-medical use is provided. Rather than a medical imager 56, another scanner, model, or programmed scene may be used.

The memory 52 is a graphics processing memory, a video random access memory, a random access memory, system memory, cache memory, hard drive, optical media, magnetic media, flash drive, buffer, database, combinations thereof, or other now known or later developed memory device for storing data representing an object in three dimensions, rendering parameters values, medical datasets, depths, lightfield, and/or other information. The memory 52 is part of the medical imager 56, part of a computer associated with the GPU 50, part of a computer associated with the processor 58, a database, part of another system, a picture archival memory, or a standalone device.

The memory 52 stores scan data representing one or more patients. For example, data from the medical imager 56 is stored. The data is in a scan format or reconstructed to a three-dimensional grid format. The scan data is stored for rendering using light transport simulation.

The memory 52 stores data representing the lightfield of an object in three dimensions and depths for the lightfield. The lightfield is created from path tracing rendering from different camera positions and/or orientations. Any sampling of various camera locations for generating the lightfield may be used. The stored lightfield may be compressed. The rendered images from the Monte-Carlo or other path tracing may be stored. The depths are created for the rays of the lightfield. The depths are also created from path tracing rendering from different camera positions and/or orientations.

The data for creating the lightfield and the resulting lightfield and depths are stored. Alternatively or additionally, the data used for lightfield rendering, such as the lightfield, depths, interpolation data, filtering data, and the resulting lightfield rendered images are stored.

The memory 52 or other memory is alternatively or additionally a non-transitory computer readable storage medium storing data representing instructions executable by the programmed GPU 50, processor 58, and/or a mobile device. The instructions for implementing the processes, methods, and/or techniques discussed herein are provided on non-transitory computer-readable storage media or memories, such as a cache, buffer, RAM, removable media, hard drive, or other computer readable storage media. Non-transitory computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone, or in combination. Likewise, processing strategies may include multiprocessing, multitasking, parallel processing, and the like.

In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU, or system.

The GPU 50 is a graphics chip, graphics card, multi-core processor, or other device for parallel processing to perform physically-based volume rendering, depth assignment, and/or lightfield rendering. The GPU 50 is part of a computer, workstation, server, or mobile device. The GPU 50 is configured by software, hardware, and/or firmware to implement physically-based volume rendering, depth assignment, and/or lightfield rendering.

The GPU 50 is configured by an application programming interface to render images from the 3D scan data representing a patient. Monte Carlo path tracing or other technique for probabilistic or stochastic simulation of scattering and/or absorption of photons is used to render color, intensity, or other characteristic for points from different orientations.

Using physically-based rendering, photorealistic images are rendered. The GPU 50 assigns depths and creates the lightfield.

In an alternative or additional embodiment, the GPU 50 uses the previously created lightfield and depths for rays of the lightfield for lightfield rendering. One or more images are rendered from the lightfield or selected images of the lightfield. Based on user interaction or other camera position and orientation determination, a sub-set of the lightfield and corresponding depths are selected for lightfield rendering. The lightfield used in rendering is cached in the memory 52 or another memory for filtering. The rays used in interpolation for the filtering are selected based on the depths. This depth-based selection may avoid artifacts resulting from selection of rays based on closeness at the wrong location along the rays.

The physically-based and lightfield renderings reduce the dimensionality of the 3D data. The GPU 50 renders images from data representing a 3D object in three dimensions. The pixels of the images are in a 2D view plane.

The processor 58 is a general processor, digital signal processor, the GPU 50, processor of the GPU 50, application specific integrated circuit, field programmable gate array, control processor, processor of a mobile device, or another processor. The processor 58 is configured by hardware, software, and/or firmware. The processor 58 is part of a computer, workstation, server, or mobile device separate from or housed with the GPU 50.

The processor 58 and GPU 50 may operate in sequence or parallel for creating the lightfield, assigning depths, and/or lightfield rendering. For example, the GPU 50 and/or processor 58 are configured to generate the lightfield. The physically-based volume rendering generates colors for points or pixels. The depth or depths associated with each point or pixel at each camera orientation and position is determined. Any heuristic may be used to establish the depth, such as using clustering of scattering modeled by the path tracing.

Alternatively or additionally, the processor 58 and GPU 50 use a previously generated lightfield and depths for lightfield rendering. In one embodiment, the processor 58 is part of a computer or server with the GPU 50. The processor 58 manages selection of data from the lightfield and depth, camera position, memory, caching, and/or other operations while the GPU 50 handles rendering, filtering, depth assignment, and/or other operations. Any division of labor may be used. Based on interaction from the user input device 54, other user input device, and/or programmed settings, the image is rendered.

In other embodiments, the GPU 50 or processor 58 alone perform any one or more of creating a lightfield by path tracing, assigning depths, and lightfield rendering. The GPU 50 and processor 58 are part of separate devices. For example, the processor 58 is part of a mobile device, such as a smart phone, tablet, laptop computer, virtual reality headset, augmented reality camera, wearable device, or other device that may be carrier by or on a user.

The mobile device includes the user input device 54 or a different user input. The user input device 54 is a touch screen, mouse, trackball, trackpad, button, knob, keyboard, and/or other device for receiving user interaction. The mobile device responds to the interaction by rendering from a lightfield or communicates the interaction to the GPU 50 or another processor for rendering from the lightfield and then transmittal of resulting images to the processor 58 of the mobile device for display and/or user interaction. Given the memory requirements for the lightfield, the lightfield rendering is performed by a server or remote device and the resulting image display and interaction are performed on the mobile device. Alternatively, the mobile device performs the lightfield rendering.

The display 60 is configured to present or display an image and/or user interface. The display 60 is a monitor, LCD, projector, plasma display, CRT, touch screen, or other now known or later developed device for displaying an image or images. The mobile device includes the display 60, such as a touch screen. A server or computer may include the display 60.

Various arrangements of components may be used. In one embodiment, the GPU 50 and processor 58 are part of a server, and the mobile device acts as a client via an application or web client. The server performs rendering so that the mobile device may avoid processing associated with rendering and/or avoid data transfer of the lightfield. Any division of processing to physically-based render, generating the depths, and lightfield render may be provided between the server and the mobile device. The GPU 50 and the processor 58 may be in a same device, in separate devices (e.g., server and mobile device), and/or duplicated in the different devices (e.g., GPU 50 in the server and another in the mobile device). Only one of the GPU 50 and the processor 58 may be used or both combined.

Communications are handled over a computer network, such as communicating user interaction from the mobile device to the server and rendered images from the server to the mobile device. The server provides rapid rendering from the lightfield and depths, such as providing an image within a few seconds (e.g., 5 seconds or less) of receiving an interaction at the user input device 54.

High quality photorealistic rendering (e.g., using Monte Carlo path tracing) is computationally expensive and may not be suitable for direct rendering on low powered mobile devices. The results of such rendering may be explored on a web application or the mobile device using lightfield rendering. The lightfield and depths provide for various degrees of interaction without having to re-renderer using path tracing, at the time of interaction. This approach may be used to provide an interactive visualization for a remote connection to a rendering service.

For AR or VR applications, the requirement for rapid (e.g., 90+ Hz) screen refreshes makes many traditional forms of photorealistic rendering infeasible, whereas the lightfield generated from such rendering systems may be rendered at such high frame rates. The rapidly rendered image from the lightfield may be integrated with added data and/or an image from a camera in AR applications.

In other embodiments, the lightfield renderings and/or lightfield and depth information creation are performed on a computer, such as a workstation or desktop without communication to a remote mobile device. In another alternative embodiment, the mobile device performs the lightfield renderings and generation of the lightfield and depths without using the server.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. A method for lightfield volume rendering, the method comprising:

rendering, by a graphics processing unit or processor as a physically-based renderer and from a medical dataset representing a three-dimensional region of a patient, the medical dataset from a patient scan by a magnetic resonance or computed tomography scanner, to create a lightfield representing the three-dimensional region of the patient in a plurality of two-dimensional views, the rendering stochastically generating a plurality of depths of scattering for each pixel of each of the two-dimensional views;

assigning depths to locations for the pixels of the two-dimensional views in the lightfield, the depth for each pixel of each of the two-dimensional views of the lightfield being determined as a depth combination calculated from the plurality of depths at which stochastically determined scattering used in the rendering by the physically-based renderer for that pixel occurs;

filtering the two-dimensional views as a function of the depths assigned to the pixels of the lightfield;

rendering, by a lightfield renderer performing the filtering, another image representing the three-dimensional region of the patient from the lightfield and depths assigned to the pixels of the lightfield; and transmitting the other image.

2. The method of claim 1 wherein rendering the lightfield comprises rendering with path tracing.

3. The method of claim 1 wherein rendering the lightfield comprises Monte Carlo-based rendering.

4. The method of claim 1 wherein rendering the lightfield comprises rendering from a plurality of different camera positions relative to the medical dataset.

5. The method of claim 1 wherein assigning comprises, for each pixel of the pixels of the rendered lightfield, locating the depth where the depth combination is an average of the depths of scattering in the physically-based render for the pixel.

6. The method of claim 5 wherein locating comprises locating the depth from a weighted average depth of the scattering, the weighting being a function of color at the depths of scattering being averaged.

7. The method of claim 1 wherein assigning comprises, for each pixel of the pixels of the rendered lightfield, locating the depth where the depth combination is a clustering of sampling points used by the physically-based renderer in rendering the pixel.

8. The method of claim 7 wherein locating the depth with clustering comprises binning depths for the sampling points in a histogram and selecting the depth with a greatest number of hits in the histogram.

9. The method of claim 8 further comprising using multiple depth histograms and sub-dividing the depth histograms.

10. The method of claim 1 wherein assigning comprises generating a plurality of depths for each of at least some of the pixels.

11. The method of claim 1 wherein rendering the other image comprises selecting images of the lightfield with the depths, and interpolating from the selected images.

12. The method of claim 1 wherein filtering comprises using the depths to determine closest rays of the lightfield and wherein rendering comprises generating the other image from the closest rays, where an outlier depth is not included in the depths to determine the closest rays.

13. The method of claim 1 further comprising receiving an interaction from a user input device, the interaction relative to a lightfield image, and wherein rendering the other image comprises rendering from the lightfield based on the interaction.

14. A method for lightfield volume rendering, the method comprising:

rendering, by a graphics processing unit or processor as a physically-based renderer and from a medical dataset representing a three-dimensional region of a patient, to create a lightfield representing the three-dimensional region of the patient in a plurality of two-dimensional views;

assigning depths to locations for pixels of the two-dimensional views in the lightfield, the depths for the pixels of the two-dimensional views of the lightfield each determined from a combination of a plurality of depths at which stochastically determined scattering occurs where the scattering is determined in the rendering by the physically-based renderer;

filtering the two-dimensional views as a function of the depths assigned to the pixels of the lightfield;

rendering, by a lightfield renderer performing the filtering, another image representing the three-dimensional region of the patient from the lightfield and depths; and transmitting the other image.

* * * * *